May 24, 1966   D. J. AEDER ET AL   3,252,533
SNOW SCOOTER
Filed Aug. 19, 1963   2 Sheets-Sheet 1
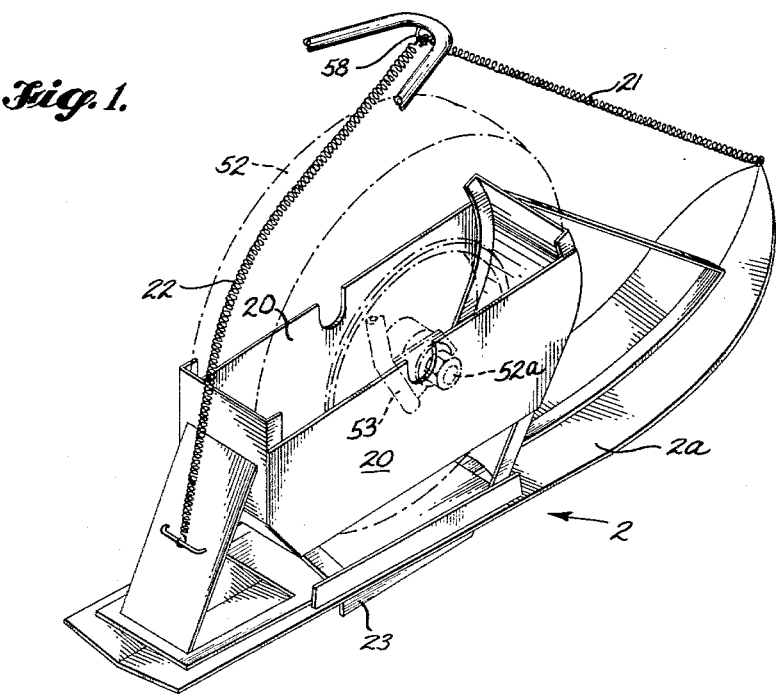
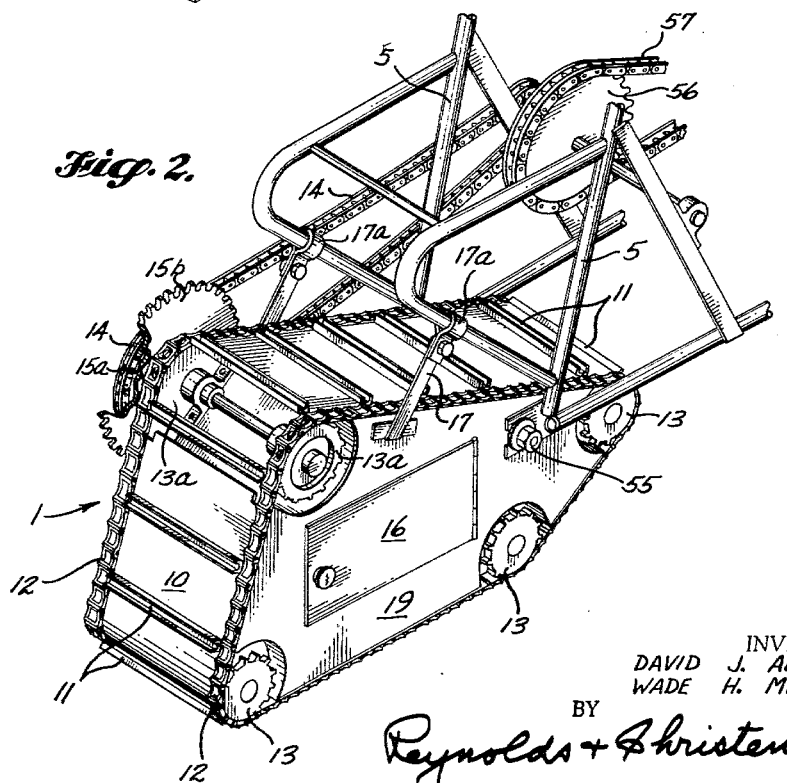
INVENTORS
DAVID J. AEDER
WADE H. MILLS
BY
Reynolds + Christensen
ATTORNEYS

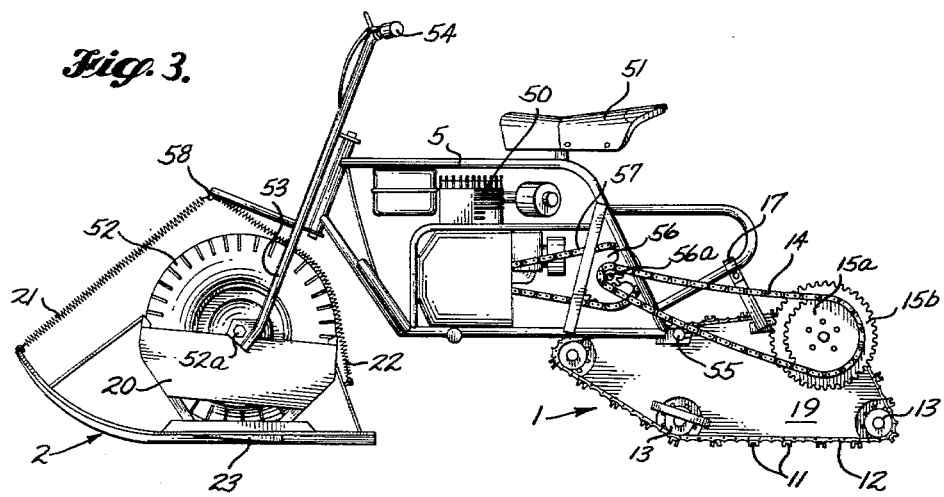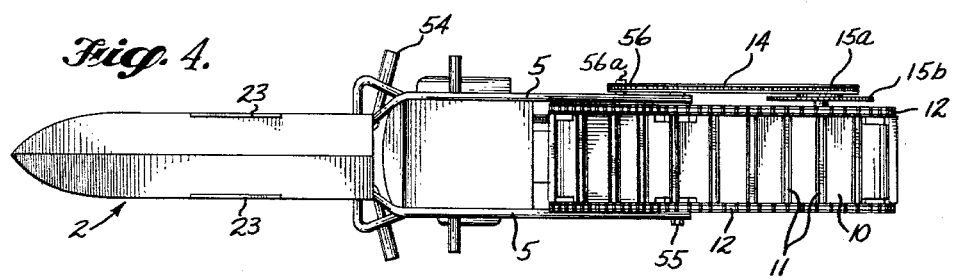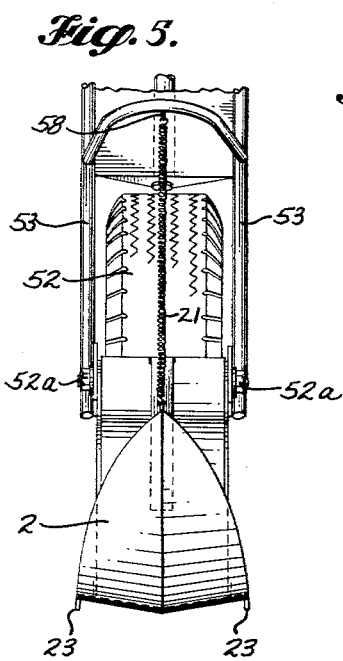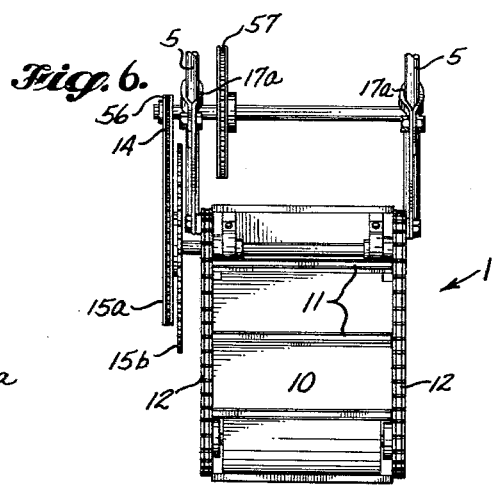

United States Patent Office
3,252,533
Patented May 24, 1966

3,252,533
SNOW SCOOTER
David J. Aeder, 6407 NW. Corbett, Portland, Oreg., and
Wade H. Mills, Box 127, Kosmos, Wash.
Filed Aug. 19, 1963, Ser. No. 302,899
5 Claims. (Cl. 180—5)

This invention relates to motor scooters of the type generally used on mountain trails and more particularly concerns steering and traction devices by which motor scooters may be used on snow. A particular object hereof is to provide adapters by which conventional motors scooters may be converted quickly for operating on snow, although it will be appreciated that the principles of the invention may also be applied in the manufacture of complete snow scooters as original equipment. The invention is herein illustratively described by reference to the presently preferred embodiment thereof; however it will be recognized that certain modifications and changes therein with respect to details may be made without departing from the essential features involved.

A further object of this invention is to provide front and rear attachments for motor scooters which are sufficiently light in weight and small enough that they can be transported conveniently and can be installed quickly on the trail in order to continue travel under power over snow and icy surfaces (hereinafter designated merely as "snow") with a degree of control, maneuverability and efficiency as nearly as possible equal to that achieved on bare ground by a conventional motor scooter.

A further object is to provide steering and traction attachment devices of such a nature at relatively low cost, of a durable and readily manufactured form, and of such a nature that the installation and removal thereof from a conventional motor scooter is performed quickly and easily with minimum tool requirement.

A further object hereof is to provide adapter devices which will readily carry the weight of the vehicle and rider on soft snow and will provide a maximum of driving effort thereon while affording the desired degree of control, stability and maneuverability of the vehicle. Further, the adapter means are so devised as to permit operating the vehicle safely and efficiently over hard snow and soft snow alike and over varying types of terrain including horizontal or inclined traversals of side slopes as well as in direct climbing and descent of hills and in travel over flat country.

A related object is to provide steering and traction devices for a snow scooter which will permit running downhill under a free-wheeling condition if desired, as on a single ski, but with full control over steering and with means to brake the vehicle when desired, such as through compression of the drive motor or by application of separate braking effort.

A specific effort is to provide a forward ski-like attachment which may be mounted directly on the vehicle wheel without necessity for removing the wheel and with an effective and simple means to permit the attachment to rock about the axis of the wheel in order to track over surface irregularities and thereby provide maximum continuity in contacting the snow for purposes of stability and steerability.

A further object is to provide a novel ski-like traction attachment substituting for the driving rear wheel of the vehicle and which will function both as a ski and as a traction device while incidentally, in a preferred form, providing enclosed storage space for tool kits, food, clothing, etc. In particular it is an object to provide such an attachment which provides maximum traction in the upright position of the vehicle as well as when it is banked in relation to the ground surface. Still another object is to provide such an attachment which is readily mounted on existing scooters with a minimum of disassembly and reassembly of parts thereof.

As herein disclosed the novel snow scooter comprises a ski-like front wheel attachment in which the lower surface of the ski member is formed with a large obtuse dihedral angle the apex of which extends along the longitudinal midplane, as the V-bottom of a motor boat, and which is mounted upon the front wheel of the scooter by means of a cradle-like structure which receives the vehicle wheel, with resilient elements connecting the vehicle frame thereto in order to maintain the attachment normally in a level condition while permitting the same to rock about the axis of the wheel against the return force of the resilient means. Anti-skid fins mounted on the side edges of the ski-like member provide stability against side-slip without materially increasing drag.

The improved scooter also comprises a traction attachment which replaces the rear wheel of a scooter and comprises a box-like enclosure having a peripheral surface or portion of which represents a ski-like bearing member and having closing sides through which access may be gained to the interior of the enclosure for storage purposes. Endless chains extend around the peripheral side edges of the enclosure, guided on sprockets and serve as carriers for cleats which extend transversely across the peripheral base of the attachment at spaced intervals along the length of such surface. As a result of the spacing between cleats the ski-like lower surface rests directly on the snow and is swept repeatedly by successive cleats as the chains are driven through application of power to the drive sprockets for the chains. In the same manner application of braking effort may be applied through the sprockets in order to retard motion of the vehicle when desired.

These and other features, objects and advantages of the invention will become more fully evident from the following description in connection with the accompanying drawings.

FIGURE 1 is an isometric view of the front attachment, separate from the vehicle but showing parts of the vehicle to illustrate the manner of attachment.

FIGURE 2 is a like view of the rear attachment including parts of the vehicle per se in order to illustrate the mounting arrangement.

FIGURE 3 is a side elevational view of the snow scooter, ready for use.

FIGURE 4 is a bottom plan view of the snow scooter.

FIGURE 5 is a front elevational view, to a larger scale, of the front attachment and a portion of the vehicle upon which it is mounted, and FIGURE 6 is a rear elevational view of the rear attachment and associated portions of the vehicle.

A representative two-wheeled vehicle chosen to illustrate the use of the invention comprises a skeleton tubular frame 5 supporting an engine 50 and a seat 51. It is supported in normal use over ground by a front wheel 52 journaled at 52a in a fork 53 that is steerable by handle bars 54. At the rear it is supported by a rear driving wheel, not shown herein, but journaled in the frame at 55, and driven from the engine 50 through drive means such as includes a chain 57 running about a sprocket wheel 56 that drives the smaller sprocket wheel 56a, from the latter of which a chain drive extends to a sprocket wheel (not shown) fast to the driving wheel. A fuel tank and suitable controls are also carried by the frame.

To convert or transform such a vehicle for travel over snow in accordance with this invention it is only necessary to remove the rear wheel, which is easily done, to fix to the frame in its place a traction attachment connecting it by a drive chain to the engine, and to apply to the front wheel 52 a steering attachment.

The rear attachment 1 is shown installed on the vehicle, in FIGURES 2, 3, 5 and 6. It includes a fairly broad peripheral band or surface 10, flat on its bottom and of sufficient area to afford support at the rear for the vehicle and its rider when resting upon snow.

Preferably two endless chains 12 extend around the opposite edges of the peripheral surface 10, and carry transversely extending cleats of channel-like form which travel over the surface 10, with the cleats 11 spaced at intervals lengthwise of the chains. The surface 10 is conveniently of somewhat irregular quadrilateral shape, viewed from the side, and at the corners paired sprocket wheels 13 guide the chains. One such pair of sprocket wheels, 13a, is driven from the engine 50. The drive illustrated includes a chain 14 running about the driving sprocket wheel 56a, already mentioned, and about one or the other of sprocket wheels 15a or 15b, fast to the shaft of the sprocket wheels 13a. By choice between the sprocket wheels 15a and 15b the mechanical advantage of the drive can be altered.

Preferably the rear attachment 1, in addition to serving as a rear support for the vehicle and for its drive, serves as a convenient enclosure for articles that may be needed during use of the vehicle, such as food supplies, tools, equipment, etc. It is therefore completed structurally and enclosed by upright sides 19 cooperating with peripheral surface 10 to form a sealed enclosure. An access opening formed in one or both sides is closed by a door 16. The sprocket wheels 13, 13a are recessed into the corners of the closure thus formed, whereby the chains 12 and cleats 11 contact its peripheral surface 10 as the vehicle progresses over the snow. Particles of snow lubricate the load-bearing lower areas of the ski member 10 against wear from the cleats 16. The rear attachment is preferably fixed with relation to the frame 5. It is so held by securing it to the frame at the wheel mounts 55 in place of the dismounted rear wheel, and to frame bars at 17a by struts 17.

The front of the vehicle is supported on snow by a load-bearing steering attachment 2 which mounts directly on the front wheel 52 and without necessity for removing the wheel. This attachment comprises a ski-like member 2a upon the upper side of which is mounted a braced cradle 20 of a size to snugly receive the front wheel. Connecting springs 21, 22 extend downwardly and both fore and aft from a connection to the frame portions 58, mounted rigidly on the fork 53, to the front and rear ends, respectively, of the ski. These springs hold the attachment 2 in place with its bottom disposed normally in a generally level attitude, yet permit the ski to rock about the wheel's axis at 52a as it moves over uneven ground.

As a motor scooter is driven over the ground the rider causes it to lean to the left about a left turn, and to the right about a right turn. Partly in order that he may do so when moving over snow, the bottom of the ski 2 is given a dihedral angle, as is best seen in FIGURE 5. This dihedral form also provides stability and a self-righting tendency in snow somewhat in the manner that the prow and bottom of a boat provide these characteristics in water. It will be understood that leaning of the vehicle affords some turning effort due to the upturned form of the ski, and that additional turning effort will result from actual turning of the front wheel assembly. In order to cause the ski to bite into the snow during a turn, and to resist sidewise slippage, short longitudinal flanges or fins 23 depend at the opposite edges of the ski 2a. They need only be a fraction of the length of the ski bottom itself and should be located generally beneath the wheel axis, that is intermediate the ends of the ski. During straight-ahead travel traversing a side hill they also prevent slipping sidewise. The dihedral angle of the bottom surface also resists sidewise slippage of ski 2a when the scooter is banked, and its bottom V-ridge prevents side-slip when the ski is turned for steering, but without catching and tripping or incurring undue drag.

When power is applied to drive the chains 12 and their cleats 11, these will wipe lengthwise of the ski-like bearing surface at 10, and will advance the scooter. The ski 2a, ahead of the drive chain means will tend to smooth and pack down the snow so that the cleats 11 will bite into it. As previously stated, wear of the rear attachment surfaces is resisted by snow particles acting as a lubricant. The chains 12 are at the opposite edges of the surface 10 and the transverse cleats extend to these edges, hence even on side slopes or uneven surfaces or in bank turns there will be ample drive traction and positive grip against side-slip, due to the sharp corners formed by the enclosure at its lower sides.

It is particularly to be noted that the cleats 11 are rather widely spaced and that snow will have direct access for support, in the intervals between cleats 11, to the smooth peripheral surface 10. This ski surface thus supports a major part of the weight load of the vehicle directly from the snow. Heavy loading of the cleats is thus avoided, and with it undue abrasive wear of the cleats against surface 10, yet as the cleats move rearwardly across the rear ski surface the snow is gripped by them.

These and other aspects of the invention will be evident from the drawings and the foregoing description illustrating the presently preferred embodiment.

We claim as our invention:

1. Means for converting a power-driven two-wheel vehicle, such as a scooter, for travel over snow, comprising a ski runner, means to fix the same to and beneath the vehicle's steerable front wheel, a rear ski-like attachment formed with a generally flat peripheral surface including a snow-engaging bottom surface and adapted to be supported at the rear of the vehicle after removal of the driven wheel thereof, means to fix said attachment to the vehicle as the rear support thereof, said attachment further including an endless drive chain means including paired chains extending around the respectively opposite edges of said peripheral surface and transverse cleats joining said chains and spaced at intervals along the same, said chain means encircling the rear attachment and being guided for movement thereabout to sweep the cleats across the bottom surface thereof lengthwise of the latter, paired sprocket wheels guiding said chains for conjoint advance of said cleats over the peripheral surface, and a drive sprocket wheel operatively connected with one pair of guiding sprocket wheels, and arranged to be driven from the vehicle's power drive.

2. The means defined in claim 1, wherein said rear attachment is generally of box-like form and includes a level bottom surface and an upwardly and forwardly inclined surface ahead of said bottom surface, and is recessed at its corners, with paired sprocket wheels conjointly rotatable and received in such recesses, and spaced apart to lie at the opposite sides of the attachment.

3. In a means for converting a power-driven two-wheel vehicle, such as a scooter, for travel over snow, a rear sled formed with a broad, generally flat peripheral surface, including a supporting bottom for rest upon the snow, paired endless chains at the opposite edges of the peripheral surface, paired and conjointly rotatable sprocket wheels carried by the sled and over which the chains run, transverse cleats interconnecting the chains and spaced at intervals along the same, at least certain of said sprocket wheels being positioned in relation to the peripheral surface to guide the chain and thereby the cleats for movement in a path extending along and adjacent to said supporting bottom, and means for operatively connecting one pair of sprocket wheels, for driving the same, to the vehicle's power drive.

4. A means as stated in claim 3, wherein the sled is formed hollow, with opposite sides joining the edges of the flat peripheral surface, one such side having an access opening, and a closure for said opening.

5. A snow scooter comprising a frame structure including a steerable front section turnable about an upright axis, and a rear section, power means mounted on the frame structure, a front ski-like attachment mounted on the steerable front section to turn therewith, a driving traction rear attachment mounted on the rear section and including a bottom bearing surface and an endless chain means of traction cleats operatively connected to the power means for traversing said bearing surface, with spacing between such cleats to permit direct bearing of said surface on the snow, said rear attachment comprising a hollow box-like structure having an access opening and a closure device for covering the same, the lower surface of said box-like structure being of ski-like form, pairs of sprockets mounted at opposing corners of said box-like structure upon respectively aligned horizontal axes and recessed in such corners, said chain means comprising two endless chains engaging the sprockets of the respective pairs, and transversely extending cleats interconnecting such chain means at spaced intervals along the length thereof.

References Cited by the Examiner

UNITED STATES PATENTS

| | | |
|---|---|---|
| 654,291 | 7/1900 | Stith. |
| 1,079,164 | 11/1913 | Chennette _____ 180—5 |
| 1,098,523 | 6/1914 | Oakes _____ 180—5 |
| 1,250,739 | 12/1917 | Wells _____ 180—6 |
| 2,284,075 | 5/1942 | Tucker et al. _____ 180—5 |
| 2,393,309 | 1/1946 | Cochran _____ 180—9.22 |
| 2,702,088 | 2/1955 | Klimek _____ 180—5 |
| 3,170,533 | 2/1965 | Fewel et al. _____ 305—34 |

FOREIGN PATENTS

| | | |
|---|---|---|
| 610,777 | 12/1960 | Canada. |
| 986,197 | 3/1951 | France. |

LEO FRIAGLIA, *Primary Examiner.*